Sept. 5, 1944.  H. F. TEICHMANN  2,357,702
MANUFACTURE OF BLOWN GLASS ARTICLES
Filed Oct. 10, 1939  5 Sheets-Sheet 1
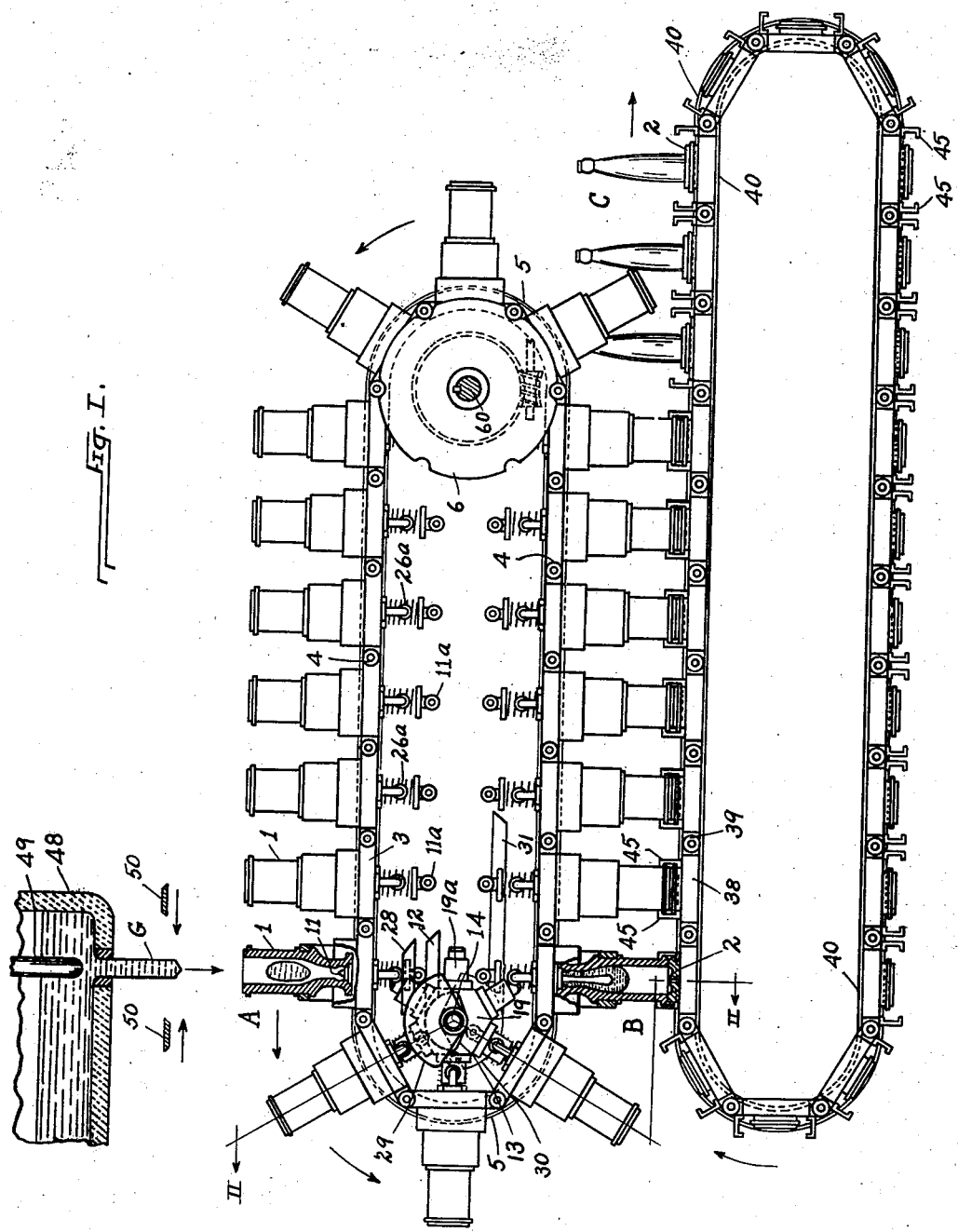
Fig. I.
INVENTOR
Henry F. Teichmann
by Christy and Wharton
his attorneys

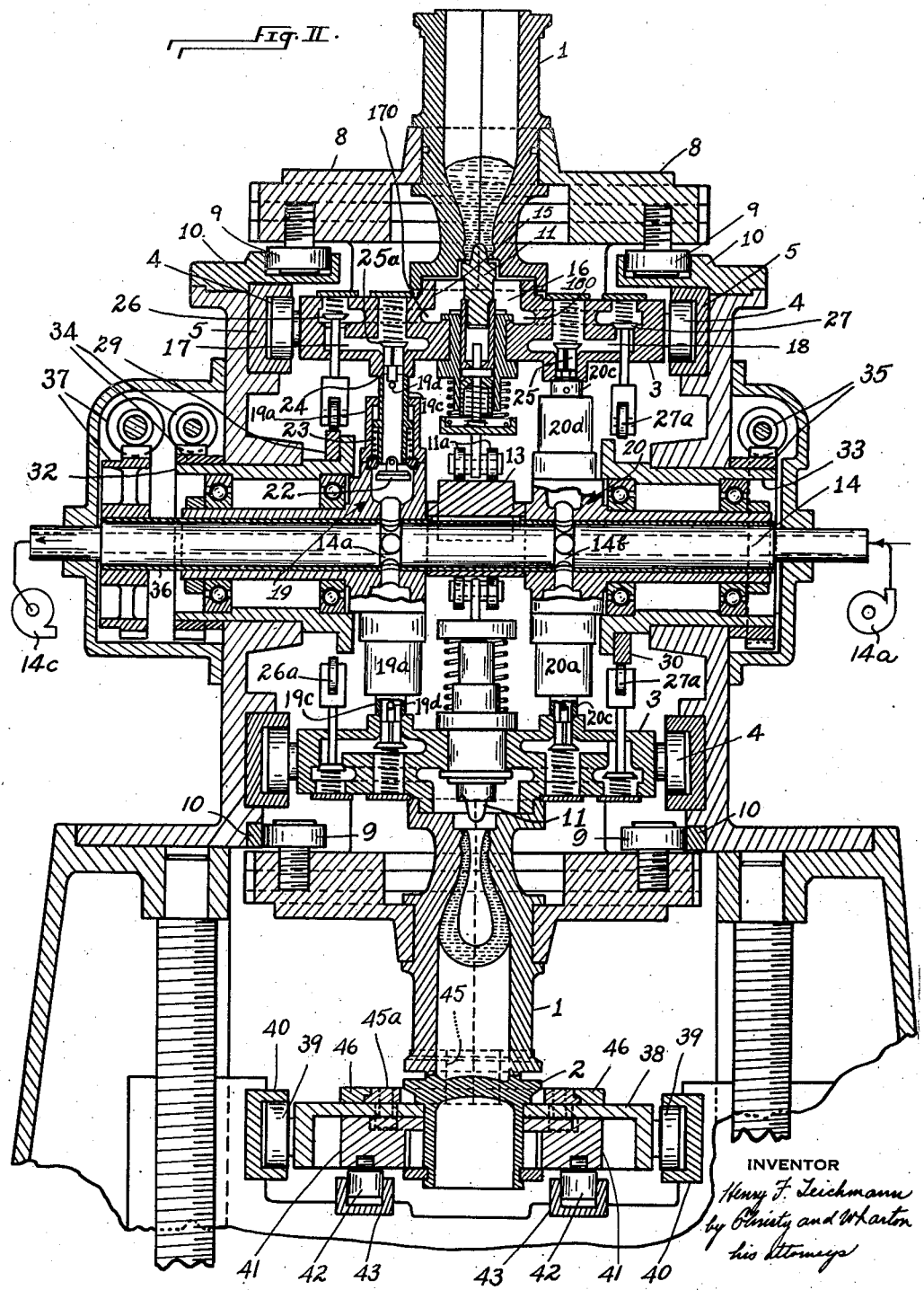

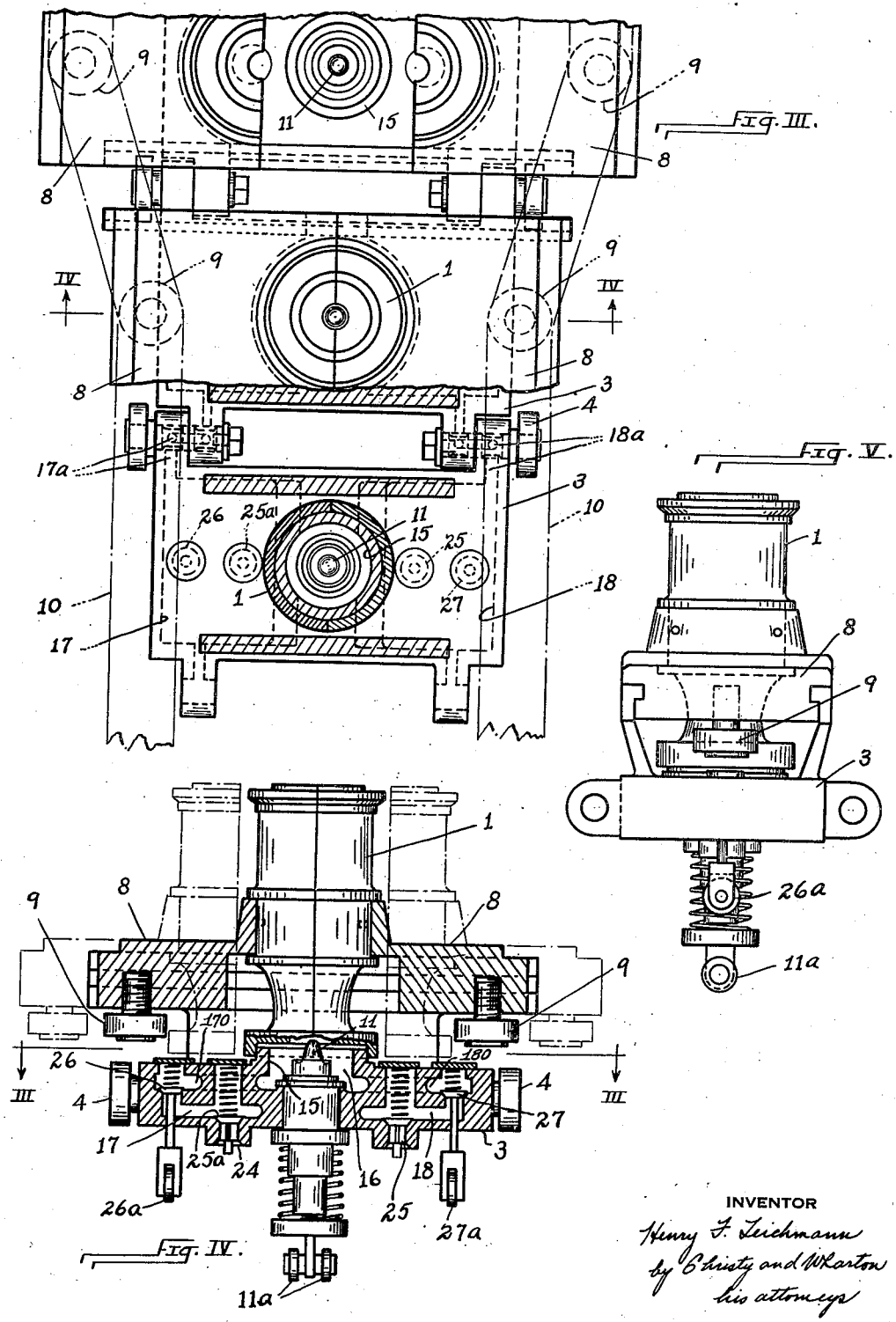

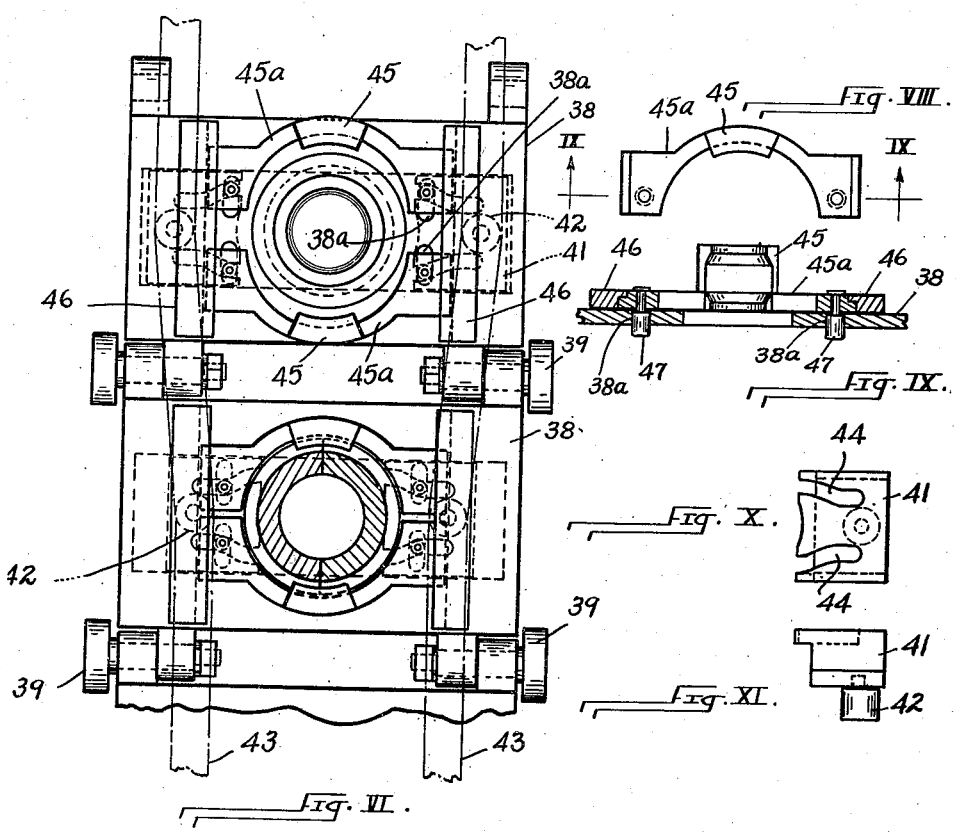
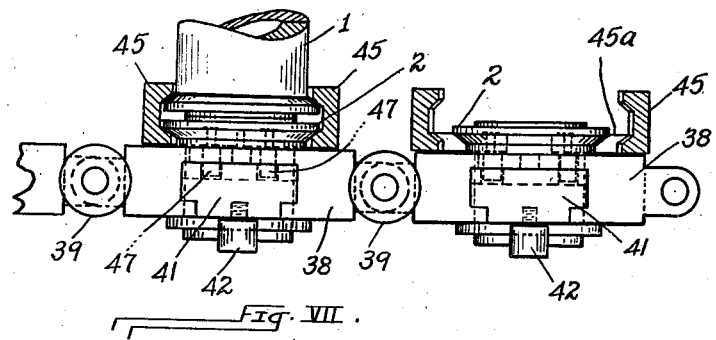

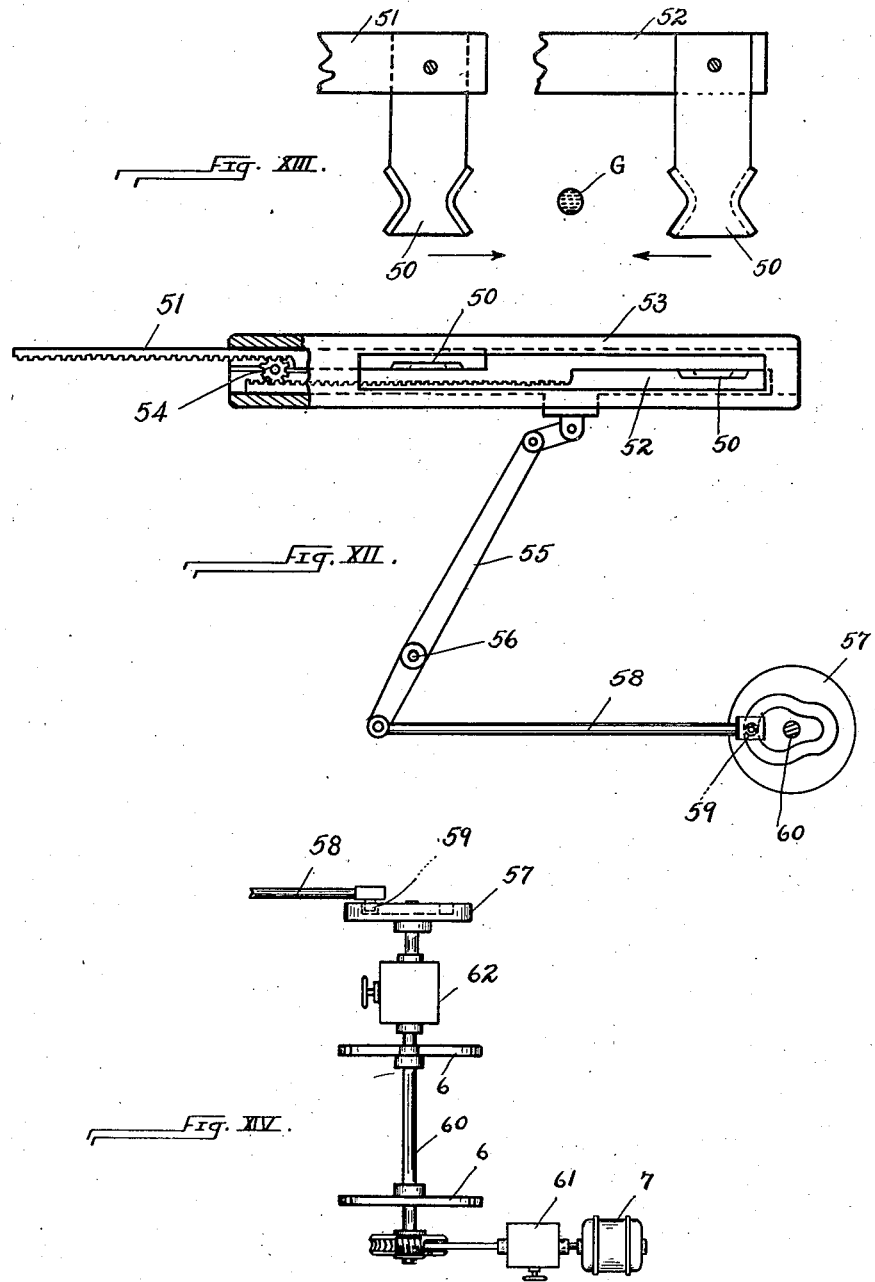

Patented Sept. 5, 1944

2,357,702

UNITED STATES PATENT OFFICE 2,357,702

MANUFACTURE OF BLOWN GLASS ARTICLES

Henry F. Teichmann, Washington, Pa., assignor to Forter-Teichmann Company, Pittsburgh, Pa., a corporation of Pennsylvania Application October 10, 1939, Serial No. 298,775

20 Claims. (Cl. 49—5)

This invention relates to the production of blown glass articles, typically bottles, and is found both in method and apparatus. The objects in view are simplicity and economy in procedure and in apparatus, and superiority in quality of product.

In the accompanying drawings Fig. I is a view partly in side elevation, partly in section, and in some degree diagrammatic, of apparatus of the invention and in operation adapted to perform the method of the invention. Fig. II is a fragmentary view to larger scale of the apparatus of Fig. I, seen in transverse section. The plane of Fig. II is a broken plane, indicated by the lines II—II of Fig. I. Figs. III, IV, and V illustrate, on like scale with Fig. II, a portion of the apparatus. Fig. III is a view, partly in plan, partly in horizontal section; Fig. IV is a view, partly in front elevation, partly in vertical section; and Fig. V a view in side elevation. The plane of section of Fig. III is in Fig. IV indicated at III—III, and the plane of Fig. IV is in Fig. III indicated at IV—IV. Figs. VI and VII are fragmentary views, showing in plan and in side elevation another portion of the apparatus. In these figures certain details are shown in section. Figs. VIII and IX are views in plan and in section of a certain clamping member that forms part of the assembly as seen in Figs. VI and VII. The plane of section of Fig. IX is indicated at IX—IX, Fig. VIII. Figs. X and XI are views in plan and in elevation of a certain slide that forms part of the assembly as seen in Figs. VI and VII. Fig. XII is a diagrammatic view, partly in side elevation and partly in vertical section of the shear mechanism that forms part of the apparatus. Fig. XIII is a diagrammatic view in plan of the shear blades in their mountings, the material under shearing action being indicated in cross section between them. Fig. XIV is a diagrammatic view in plan of driving mechanism, including means for making adjustment of the speed at which the forming members advance and of the speed of the shear mechanism with relation to that of the forming members.

The apparatus includes a plurality of travelling molds severally formed of mold parts 1 and 2. The mold parts 1 severally receive (at A) successive gobs of plastic glass; the charged mold parts 1 are successively united (at B) with the mold parts 2, and form molds within which articles are shaped; the molds deliver (at C) successive finished articles.

A succession of plates 3, with the plates articulated as shown in Fig. III, is formed into an endless chain. The axles upon which the plates are articulated project laterally and carry rollers 4. A pair of stationary guideways 5, spaced apart transversely of the apparatus, and a pair of rotary sprocket wheels 6, also so spaced apart, receive the rollers 4 and support the chain in the position shown in Figs. I and II. The chain extends in upper and lower horizontal reaches, interconnected by rounded courses at the ends. The sprocket wheels 6, suitably driven as by a motor 7 (Fig. XIV), cause the endless chain of plates 3 to advance in the counter-clockwise direction indicated by arrows in Fig. I.

The mold parts 1 in turn are subdivided. Each consists of two portions, and in the cycle of machine operation these two portions close to serve unitedly their essential mold function, and open to release the finished article. The two portions of a mold part are severally mounted upon slide 8 that are borne in pairs, a pair upon each plate 3. The slides are mounted to move upon plates 3 in direction transverse to the line of advance of the plates. The slides are provided with vertically extending posts upon which are mounted rollers 9. The rollers are engaged by stationary guides 10; and the guides are so proportioned that, as the plates advance in their course, the portions of the several mold parts 1, in ordered progress, close and open again. Each plate 3 carries also a vertically reciprocable plunger 11. This plunger is normally held by spring tension in retracted position, but in the course of plate advance it is engaged by a stationary abutment and by such engagement it is projected against spring tension into the space within the closed portions of the mold part 1; and the plunger, indeed, becomes itself a mold member. In Fig. II, a plunger 11 is shown in section above (in a plate in the upper reach of the chain), in projected position, of cooperation with mold part 1; and another plunger 11 is shown below in elevation (in a plate in the lower reach of the chain), in retracted position. In Fig. I the abutment that so effects the projection of the plunger is shown to consist of a bar 12 having an oblique face to meet the rollers 11a with which the end of the advancing plunger is equipped. The bar is continued in a sector-shaped block or cam 13. And it will be seen that the surface against which the plunger rests, and by resting is held in projected position, is parallel with the course of the advancing plate 3 in which the plunger is carried.

Provision is made for establishing through the plate 3 and within the closed mold part 1, successively in the course of advance, conditions of suction and pneumatic pressure. To such end a shaft 14, suitably mounted, extends transversely within the endless assembly of plates 3 and concentrically with the circularly curved left-hand end of the assembly, as seen in Fig. I. Shaft 14 is bored from opposite ends with bores that extend inward less than half way, and that lead severally to two circumferential grooves 14a and 14b in the face of the shaft that in the assembly are arranged on opposite sides of the vertical mid-plane of the chain of molds (cf. Fig. II).

The two portions of the mold part 1 close upon a circular boss 15 that rises from plate 3. The parts are nicely machined and the closure is substantially air-tight. The plunger in its projection is, by proper proportioning of parts, caused to approach but not hermetically to engage the adjacent mold surfaces. A clearance remains, providing a passageway to a centrally arranged chamber 16 within plate 3, and from chamber 16 passages 17a and 18a extend to one side and the other, and from these lateral passages there is valve-controlled communication to lateral chambers 17 and 18. The valves, 26 and 27, that control such communication close outwardly, in the line of flow from the mold part, and are raised against spring tension by stress exerted upon their stems. The bore to the right in shaft 14 (Fig. II) may be understood to be in communication with a source 14c (an air compressor) of compressed air, and from this bore there is communication through a spring-backed check valve 25 with chamber 18. The bore to the left in such shaft may be understood to be in communication with an air pump 14d or other air-exhausting apparatus, and from chamber 17 there is communication with the last-mentioned bore, communication being controlled by a spring-backed valve 25a that closes in the direction of flow. Lines of communication (indicated at 17a and 18a in Fig. III) extend through the pivotal unions between the plates 3, and all the suction chambers 17 throughout the series of plates are in communication, and all the pressure chambers 18 are also in communication. Lines of communication between the two series of chambers 17 and 18 in the successive plates 3 and the respective suction and pressure bores in shaft 14 are progressively and intermittently completed. The shaft 14 carries idly mounted upon it two interiorly chambered sleeves, 19 and 20, whose chambers are severally in free and constant communication with the two circumferential grooves 14a and 14b in the shaft. From the chambered sleeves 19 and 20 lead radial branches (19a and 20a), six branches on each sleeve, as here shown, severally carrying telescopic nipples (19c and 20c). Each nipple carries a valve 22, and a spring 23 is provided, whose tension normally holds the nipple extended and the valve seated.

As the plates 3 in the upper reach of the endless chain advance from right to left (Fig. I) and approach the beginning of their downwardly curved course, orifices 24 in the nether faces of the plates, engaging the outer ends of the nipples 19c, drive them inward against spring tension and in so doing unseat the valves 22. At the same time abutment of the stems of check valves 25a with pins 19d severally borne by the nipples operates to unseat the check valves, and, the stress of nipple-urging springs 23 exceeding the stress of the springs of valves 25a, the valves 22 and 25a are held open, and the chambers 17 of the chain of plates 3 are held in direct communication with the air pump. Such communication remains effective in the case of each plate so long as the plate continues in engagement with a nipple 19c. Similarly, the nipples 20c of the idly rotating sleeve 20 operate to establish communication from the source of compressed air to the chambers 18.

The stems of the valves 26 and 27 are equipped with rollers 26a and 27a, and, on one side of the machine a rail 28 and a sector-shaped plate 29 are provided, and on the other a sector-shaped plate 30 and a rail 31, and, by engagement with these, the valves 26 and 27 in the plates 3 are successively opened and held open as the plates advance. As the valve stems pass beyond such engagement the valves close under spring tension.

As has been said, the suction chambers 17 throughout the series of plates 3 are in communication through the hollow trunnions by which they are articulated into chain formation, and similarly the pressure chambers 18 throughout the series are in communication. And the suction chambers are through the instrumentalities described constantly evacuated and the pressure chambers constantly supplied with air under pressure through those plates of the series that are rounding the left-hand end of their course.

The sector-shaped plates 29 and 30 are mounted severally upon two sleeves 32 and 33, rotatable upon shaft 14, and the sleeves are adjusted in their positions circumferentially upon the shaft by worm drives 34 and 35. Thus the point at which the vacuum is cut off and the point at which pressure is applied through chamber 16 to the individual mold parts 1 may be minutely adjusted. And by the provision of interchangeable bars or rails 28 and 31 of various lengths the points at which vacuum is applied and pressure cut off may be nicely determined. Already the sector-shaped block or cam 13 has been mentioned, the block or cam that serves to maintain the plunger 11 in projected position. This block is mounted upon a sleeve 36 which, underlying the others, surrounds shaft 14. A worm drive 37 is provided, for rotating this sleeve and determining the point in the travel of the plates at which the plungers are withdrawn. The point at which the plunger is extended may be varied by changing the bar 12.

Cooperating with the endless succession of plates 3 that carry the mold parts 1 is a second endless succession of plates 38 that carry severally the mold parts 2. The plates 38 are articulated to form a second endless chain. The axles upon which the plates 38 are articulated are also projected and carry rollers 39. The rollers travel in stationary guideways 40. The so-supported endless chain extends in upper and lower horizontal reaches, interconnected by rounded courses at the ends; and the upper horizontal reach of this second endless chain formed by the plates 38 is arranged immediately beneath and at a spaced interval from the lower horizontal reach of the chain formed by the plates 3. The plates 38 carry rigidly the mold parts 2. The upper reach of the lower endless chain extends in the direction of travel (to the right) beyond the lower reach of the upper chain.

The plates 38 carry clamps, by which the advancing mold parts 1 upon the upper chain are united one by one with the mold parts 2 upon the lower chain; and by this union the molds are completed. And by this union also the lower endless chain is integrated with the upper chain and is moved as the upper endless chain moves. The direction of the consequent movement of the lower chain is clockwise, as is indicated by an arrow in Fig. I.

Each plate 38 carries a pair of oppositely placed and transversely moving slides 41, movable in suitable ways and equipped with pins upon which are mounted rollers 42. These rollers are arranged in suitable stationary guideways 43 (shown in cross section in Fig. II and diagrammatically in Fig. VI by broken lines); and as the chain advances these pairs of slides alternately approach and recede from one another. In the slides are formed cam slots 44.

Upon each plate 38 at its forward and rear edges rest oppositely placed clamping blocks 45. These clamping blocks are integrated with bowed plates 45a that bridge the interval between the slides 41 and that move longitudinally upon plate 38 in ways formed by strips 46. Each plate 45a is provided with a pair of pins equipped with rollers 47, and these roller-equipped pins, extending through elongate slots 38a in plate 38, are engaged in the slots 44 of the slides 41. As the slides 41 approach and recede, the clamping blocks 45 approach and recede.

The sections of the mold part 1 together constitute the mold walls for the mouth and side walls of a receptacle—in this case a bottle. The plunger 11 constitutes a shaping member for the inner surface of the rim of the opening or mouth of the receptacle, and the mold part 2 constitutes the mold wall for the bottom of the receptacle. When the mold parts 1 and 2 are united, the blow mold for the receptacle is completed.

The mold part 1 is mounted upon the plate 3, with its neck-forming portion inward and its open end outward with relation to the endless chain formed by the plates 3. In the upper reach of the upper chain the mold parts 1 stand in inverted position, their open outer ends upward. In the lower reach of the upper chain the mold parts 1 are in normal position and are united with the mold parts 2, forming completed molds in erect position.

The apparatus is arranged in suitable assembly with a glass tank or fore-hearth 48, and a delivery orifice with a flow-controlling rod 49 adjustably positioned thereabove, is arranged to deliver freely and continuously under gravity a stream G of molten glass, in line directly above the series of mold parts 1.

A pair of shear blades 50 is mounted to reciprocate across the stream of glass G, and, in coordination with one another, to shear the descending column of glass into a succession of gobs, one of which is diagrammatically shown within a mold, Fig. I. The blades, as shown in Fig. XIII, are edged on both sides and both edges are of reentrant or V-shaped outline. They are set with their narrowest parts centered in the line of the flowing stream G of glass; and in their reciprocation they pass entirely across the line of the stream of glass, so that in each traverse they engage and cut the glass. The reentrant advancing edges of the cooperating blades close upon and surround the stream.

The blades are carried upon two bars 51 and 52, and both of the bars are mounted to slide in a guideway 53. The bars are provided with racks, and the racks are engaged by a pinion 54 that is mounted for rotation in the stationary guideway 53. A lever 55, mounted on a stationary pivot 56, is linked at one end to the bar 52. The shaft 60 that carries the sprocket wheels 6 drives also a cam disk 57; and a connecting rod 58 provided with a cam-engaged pin 59 is pivoted to the lever 55 at its opposite end. In response to rotation of shaft 60 the bars 51 and 52 simultaneously reciprocate in opposite directions, and the shear blades cross and recross, back and forth, shearing the column G of glass with each reciprocation.

In the line of transmission between the source of power 7 and the shaft 60 is arranged a variable speed transmission 61, and in the line of transmission between shaft 60 and the cam disk 57 is arranged a variable speed transmission 62; and by such provision, not only may the speed of the mold-carrying endless chain be varied, but the speed of the shears may be accurately synchronized with the speed of advance of the molds. Additionally, I provide for the timing of the successive cutting operations of the shears with respect to the periodicity with which the traveling mold parts 1 successively reach gob-receiving position. In exemplary way such timing is obtained by adjusting the angular position of the cam plate 57 relatively to the position of the sprocket wheels 6. Thus, the shears are caused to cut in exact correlation to the position of the immediately adjacent advancing mold part.

Operation may be followed with reference to Fig. I. It will be understood that the endless chain of plates 3 carrying the mold parts 1 is being driven in counter-clockwise course, and that the shear blades 50, 50 are reciprocating, cutting the continuously descending column of glass G into gobs.

The mold parts 1, as they advance from right to left along the upper reach, are in inverted position and open above. As they advance their two portions are brought together (cf. Fig. III) and so brought together they come to position A, ready to receive the glass. As each mold part 1 comes in turn to position A it receives a severed gob of glass as it falls from the shears. While the advance of the endless mold-bearing chain may be intermittent, such that each successive mold part 1 is caused to pause in position A until it has received a gob of glass, it is important to note that the travel of the chain is, advantageously, continuous, with the advance of the open mold parts 1 so correlated to the velocity of flow of the glass stream G, and to the operation of the shears 50, that each mold receives a gob of glass while passing without interruption through position A. At such time as each mold part receives a gob the plunger 11 has, by the engagement of its stem with rail 12, been projected upward into the mouth of the mold, and a condition of suction has been set up by the unseating of valve 26, whose stem engages rail 28. Under the excess pressure from above the molten glass is molded in the lower end of mold part 1 and around the tip of the plunger 11, and thus the mouth of the receptacle (a bottle) is shaped. Such shaping is (in this case) effected while, borne by the advancing plate, the mold part advances upon the descending curved portion of its course.

At a predetermined point in this descending course, determined by the position to which the sector-shaped blocks 13, 29, and 39 are severally adjusted, plunger 11 is withdrawn, the valve 26 is released and allowed to close, and thereafter the valve 27 is unseated. Compressed air then fills the cavity in the partially shaped gob of molten glass left vacant by the retraction of plunger 11. The blowing of the glass then begins. Operation is so timed that, before the swelling bulb of glass reaches the open end of the mold part 1, the mold part 1, now in erect position, comes to registered engagement with its fellow mold part 2 of the lower endless chain, and the clamps 45 impelled by slides 41 close and secure the pair of mold parts together and complete the mold. Throughout the extent of rail 31 the valve 27 continues open, and during this time compressed air blows the bottle to completion within the mold. When the roller-equipped stem of valve 27 passes beyond the end of rail 31, the valve closes in response to spring pressure. Thereafter the slides 41 recede, the clamps 45 open, and in due sequence the slides 8, engaged by rails 10, recede, carrying with them the sections of mold part 1. This spreading of the sections or portions of the mold part 1 is completed before the mold reaches the right-hand end of the lower reach of the upper endless chain. In the further progress the mold part 1 rises free and the mold part 2 continues in further horizontal course, bearing the completed bottle standing free upon it. At the point C the bottle may be removed.

Many refinements of the apparatus described will be manifest to the engineer. For example, the lower endless chain that carries the mold parts 2 may be vertically adjusted in its mounting, to make accommodation for mold parts 1 of various heights. In such way the apparatus may be adapted to the production of articles of different sizes. The vertical interval between the fore-hearth 48, from which the stream of glass G is delivered, and the line of advancing mold parts 1 may be regulated. Again, the effective lengths of the two mold-part-carrying chains may be determined best to suit the conditions of operation and to provide the desired number of molds for the production of a particular ware.

Certain features of the invention herein defined will prove useful and valuable in the manufacture of other glass articles than blown or pneumatically formed bottles, and by way of example I direct attention to the disclosures of my copending applications Serial Nos. 361,716 and 395,767, filed October 18, 1940, and May 29, 1941, now Patent No. 2,329,146, granted September 7, 1943, respectively.

I claim as my invention:

1. In glass receptacle forming apparatus, a plurality of plates integrated to form an endless chain, means for causing the endless chain to travel, a plurality of mold parts each formed of sections mounted upon said plates, means for causing the sections to open and close as the chain travels, means for exerting alternate conditions of suction and blowing within the closed mold parts upon the plates, a second plurality of plates integrated to form a second endless chain, and a second plurality of mold parts complementary to the first mounted upon the second set of plates together with clamping means, the mold parts borne by the first chain progressively engaging the mold parts borne by the second chain, and means operated by the advancing chain for moving said clamping means.

2. A glass-blowing machine including means providing a supply of air at superatmospheric pressure, a mold carrier comprising an endless series of articulated members severally carrying mold elements, means for causing said endless carrier to travel, said members severally including air chambers in common communication, and valve-controlled passages for establishing communication between said chambers and said mold elements severally, and means effective during the travel of the carrier for establishing communication between such chambers and said supply of air at superatmospheric pressure.

3. The structure of the next-preceding claim, in which said mold carrying members each include a second chamber adapted to communicate with the mold element carried thereby, air-exhausting instrumentalities, together with means effective during the carrier advance for establishing communication between such second chamber and air-exhausting instrumentalities.

4. The method herein described of producing glass articles that comprises propelling through a primary course of advance a line of open-bottomed molds arranged with their bottoms directed upward, delivering charges of plastic glass severally into such molds, applying suction to the molds and thereby drawing the charges of glass downward into the lower ends of the molds, leading the charged molds in curved path into a secondary course of advance and inverting the molds in their movement through such path, successively closing the downwardly open bottoms of the molds thus inverted and advanced into said secondary course, then blowing the charges of glass in the so-closed molds to the form of said articles, and thereafter opening the molds and removing the blown articles.

5. The method herein described of producing glass articles that comprises propelling through a primary course of advance a line of open-bottomed molds arranged with their bottoms directed upward, delivering charges of plastic glass severally into such molds, applying suction to the molds and thereby drawing the charges of glass downward into the lower ends of the molds, leading the charged molds in curved path into a secondary course of advance and inverting the molds in their movement through such path, bringing the downwardly open bottoms of the molds thus advanced into said secondary course into tangency with a line of mold bottoms and assembling such mold bottoms severally with the molds, then blowing the charges of glass in the so-closed molds to the form of said articles, and thereafter opening the molds and leading away the mold bottoms with the blown glass articles positioned thereon.

6. Apparatus for the production of glass articles including a series of open-bottomed molds interconnected in an endless chain that extends through upper and lower reaches, means for propelling the chain, the molds in one of said reaches being arranged with their open bottoms directed upward to receive charges of plastic glass, said molds arranged to turn, in the course of advance of the chain from one to the other of said reaches, to inverted positions, means for closing the bottoms of the so-inverted molds upon included charges of plastic glass, and means for blowing the glass in the molds into said articles.

7. Apparatus for the production of glass articles including a series of open-bottomed molds interconnected in an endless chain that extends through two reaches, means for advancing the chain, the advancing molds in one of said reaches being arranged with their open bottoms directed upward to receive charges of plastic glass, said molds arranged to turn, in the course of advance of the chain from one to the other of said reaches, to inverted positions, a traveling chain of members for closing the bottoms of the so-inverted molds upon included charges of plastic glass, means for blowing the glass in the molds into said articles, and means for opening the molds, with the blown articles left standing upon the traveling chain of closure members.

8. In a machine for forming glass articles, a plurality of plates interconnected to form an endless chain, means for causing the endless chain to travel, said plates severally carrying recessed members adapted to receive in succession gobs of plastic glass, said recessed members being each formed of sections, means for causing the sections to spread and close in the course of chain travel, means including intercommunicating air chests in said plates for exerting alternate conditions of suction and blowing upon the glass within the closed recessed members upon the plates, a second plurality of plates interconnected to form a second endless chain and carrying members adapted to cooperate with the recessed members on the first chain in the shaping of the glass under the influence of said blowing means, and means for causing the two chains to travel in coordination, whereby the members borne by the first chain progressively register with the members borne by the second chain.

9. Apparatus for producting glass articles, said apparatus including means for supplying air at super-atmospheric pressure, a carrier comprising an endless series of articulated members severally carrying recessed glass-receiving portions, means for advancing said series of members, said members severally including air chambers in common communication, and passages including control valves for establishing communication between said chambers and said glass-receiving portions severally, and means effective during the travel of the carrier for establishing communication between such chambers and said air-supplying means.

10. The structure of the next-preceding claim, in which said members each include a second chamber adapted to communicate with the glass-receiving portion carried thereby, air-exhausting instrumentalities, and means effective during the advance of the carrier for establishing communication between such second chamber and said air-exhausting instrumentalities.

11. In a glass forming machine that includes two series of interconnected plates forming two endless chains, each plate carrying a mold part, the two chains being synchronously driven and being so relatively spaced that in the course of chain travel the mold parts borne by the two chains meet to form complete molds and separate again, the invention herein described which consists in arranging the two chains to travel in a common vertical plane, each with upper and lower horizontal reaches, the lower reach of one chain overhanging the upper reach of the other, the mold parts borne by the upper chain being open upwardly in the upper reach of chain travel and thus adapted to receive and carry charges of plastic glass resting by gravity within them, and means for establishing within each mold part of the upper chain successive conditions of pneumatic suction and of pressure, the condition of suction being established while the mold part advances in the upper reach of chain travel and the condition of pressure being established while the mold part advances in the lower reach of chain travel.

12. In a glass-forming machine that includes a series of mold-carrying plates articulated to form an endless chain, each plate formed with a chamber in constant communication with the plate-borne mold, each plate formed with two additional chambers and the said additional chambers being in communication in the assembly with corresponding chambers of all the plates of the series forming thereby two continuous chambers throughout the series, means for maintaining severally in such continuous chambers constant conditions of suction and of pressure, and means for bringing the first-named chamber of each plate successively in the course of its advance into communication with such suction and pressure chambers.

13. In a glass-shaping machine that includes a series of members articulated to form an endless chain, each member including a recess adapted to receive a gob of plastic glass and a chamber in communication with such recess, said members severally including additional chambers and said additional chambers being in communication throughout the series of members forming thereby a continuous chamber throughout the series, means for maintaining in such continuous chamber a predetermined condition of pneumatic pressure, and means for bringing the first-named chamber of each plate successively in the course of its advance into communication with such continuous chamber.

14. In a glass-shaping machine that includes a series of members articulated to form an endless chain, each member including a recess adapted to receive a gob of plastic glass and a chamber in communication with such recess, each member formed with two additional chambers and the said additional chambers being in communication in the assembly with corresponding chambers of all the members of the series forming thereby two continuous chambers throughout the series, means for maintaining severally in such continuous chambers predetermined pneumatic conditions, and means for bringing the first-named chamber of each member successively in the course of its advance into communication with such continuous chambers.

15. A traveling chain comprising an endless succession of articulated members severally carrying recessed glass-receiving portions, air chambers in said members arranged severally to communicate with the recessed portions severally carried by the members, the air chambers of the articulated members arranged in communication one with another, said recessed portions adapted to receive gobs of plastic glass, and means for establishing, while the chain is in course of travel, predetermined pneumatic pressure conditions in such communicating chambers.

16. In apparatus for producing glass articles, said apparatus including suction-producing means, a traveling chain comprising an endless succession of articulated members severally carrying recessed portions adapted to receive gobs of plastic glass, air chambers in said articulated members arranged severally to communicate with the glass-receiving portions carried by such members, the air chambers of the articulated members arranged in communication one with another, and means for maintaining, while the chain is in course of travel, communication between such chambers and said suction-producing means.

17. In a glass-forming machine adapted for organization with means for feeding thereto gobs of plastic glass, said machine comprising a succession of interiorly chambered members articulated together in an endless chain, means for supporting the chain for travel in endless course, means for effecting travel of the chain, the chambers within the articulated members being in communication with one another throughout the succession, means for maintaining within the chambers air under pressure substantially different from atmospheric, glass-shaping mold elements borne severally by said members, mold elements cooperating with said last-mentioned mold elements to form complete molds, passages for pneumatic communication between the chambers within said members and the matrices formed by said mold elements, and means arranged successively to open and close said passages as the chain travels.

18. In a glass-forming machine adapted for organization with means for feeding thereto gobs of plastic glass, said machine comprising a succession of interiorly chambered members articulated together in an endless chain, means for supporting the chain for travel in endless course, means for effecting travel of the chain, the chambers within the articulated members being in communication with one another throughout the succession, means for establishing within the chambers a condition of sub-atmospheric pressure, glass-shaping mold elements borne severally by said members, passages leading from said chambers within said members severally to the glass-shaping matrices of said mold elements, whereby glass-shaping suction may be applied to said matrices, means arranged to open and close said passages as the chain travels, and means cooperating with said mold elements to complete the shaping of the glass after it has been subjected to suction.

19. In a glass-forming machine adapted for organization with means for feeding thereto gobs of plastic glass, said machine comprising an endless chain including a succession of articulated members, means for supporting the chain for travel in endless course, means for effecting travel of the chain, an air chest in each of said members, said air chests being in communication with one another throughout said succession, means for establishing within the communicating air chests pneumatic pressure above atmospheric, a vacuum chest in each of said members, the vacuum chests being in communication with one another throughout the succession, means for establishing within the communicating vacuum chests a pneumatic pressure below atmospheric, means providing glass-shaping matrices in association severally with said articulated members, passages extending from said air and vacuum chests of said members to the matrices severally associated therewith, and means arranged to open and close said passages as the chain travels, whereby pneumatic pressure and suction may be successively applied to said matrices.

20. In a glass-forming machine adapted for organization with means for feeding thereto gobs of plastic glass, said machine comprising an endless chain including a succession of articulated members, means for supporting the chain for travel in endless course, means for effecting travel of the chain, a vacuum chest in each of said members, said chests being in communication with one another throughout said succession, means for maintaining a vacuum in said communicating chests, means providing glass-shaping matrices in association severally with said articulated members, passages extending from said chests to the matrices severally associated with said articulated members, and means arranged to control said passages, whereby said matrices are subject to the effect of vacuum for shaping gobs of plastic glass introduced thereto.

HENRY F. TEICHMANN.